Figure 9:
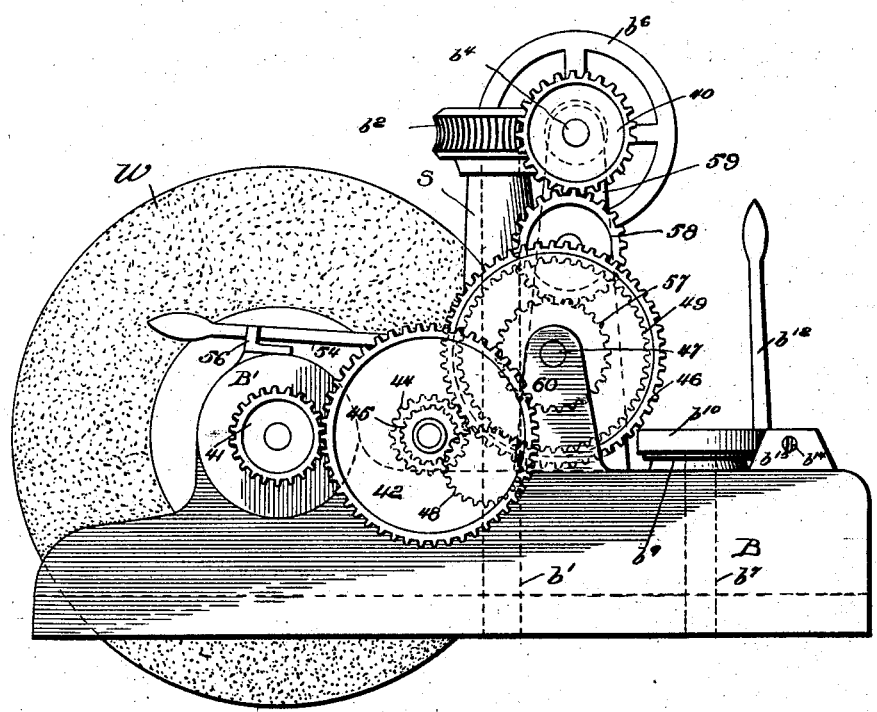

No. 785,258. PATENTED MAR. 21, 1905.
A. B. LANDIS.
GRINDING MACHINE.
APPLICATION FILED FEB. 12, 1904.
5 SHEETS—SHEET 1.
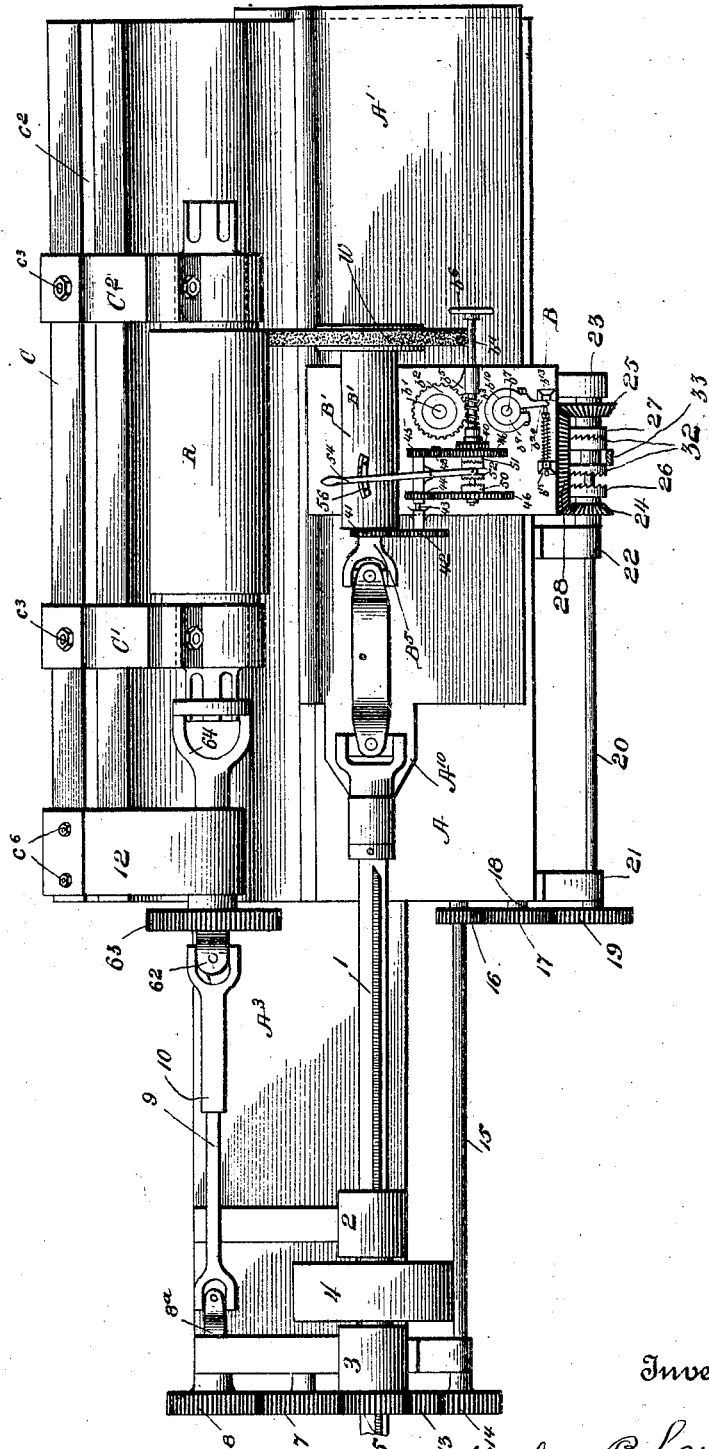
Witnesses
BM Offutt
H. Hurst
Inventor
Abraham B. Landis,
by Eli Bradford
Attorney No. 785,258. PATENTED MAR. 21, 1905.
A. B. LANDIS.
GRINDING MACHINE.
APPLICATION FILED FEB. 12, 1904.
5 SHEETS—SHEET 2.
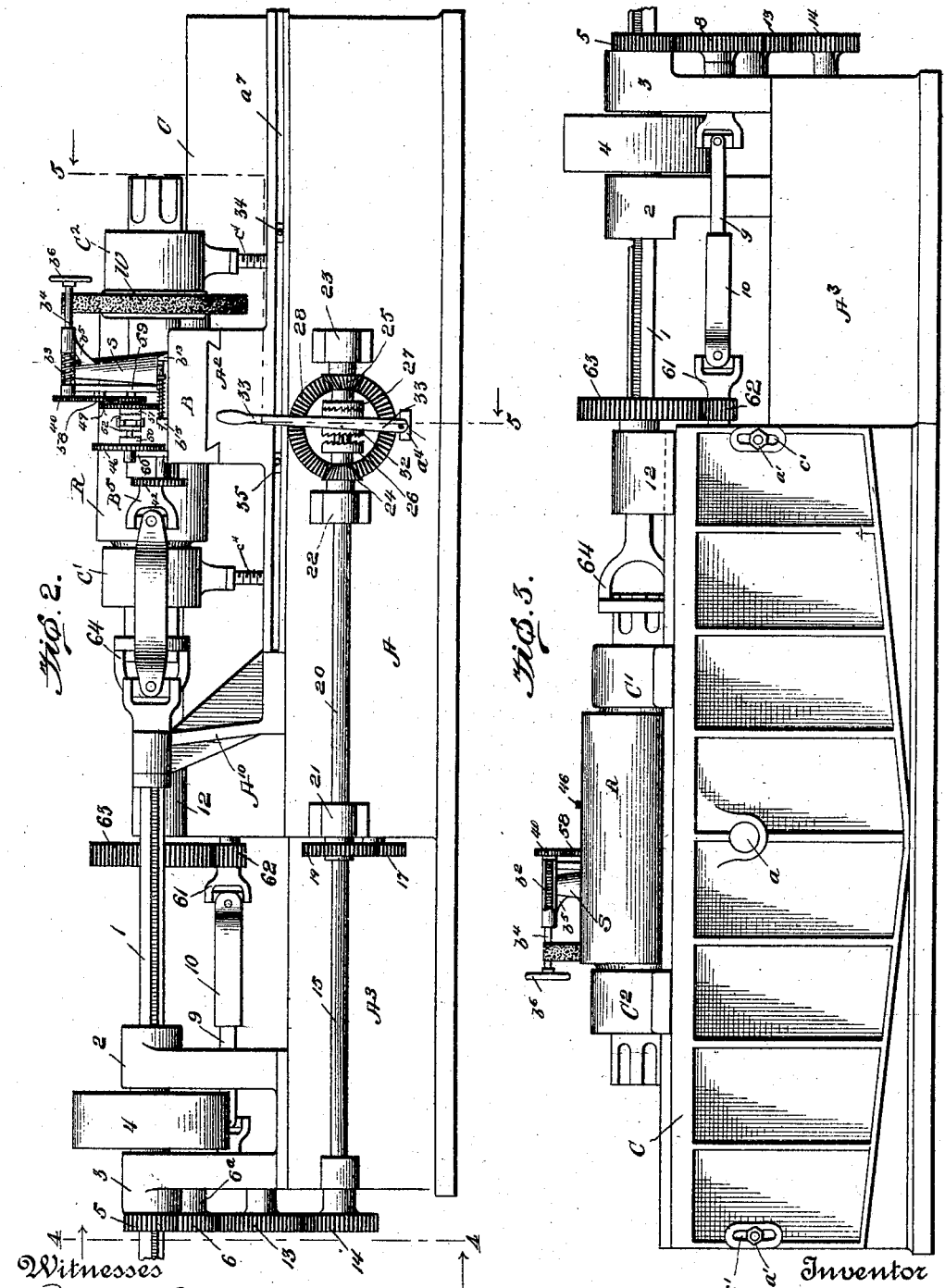
Witnesses
B. M. Offutt
K. Hurst
Inventor
Abraham B. Landis,
by E. W. Bradford
Attorney No. 785,258. PATENTED MAR. 21, 1905.
A. B. LANDIS.
GRINDING MACHINE.
APPLICATION FILED FEB. 12, 1904.
5 SHEETS—SHEET 3.
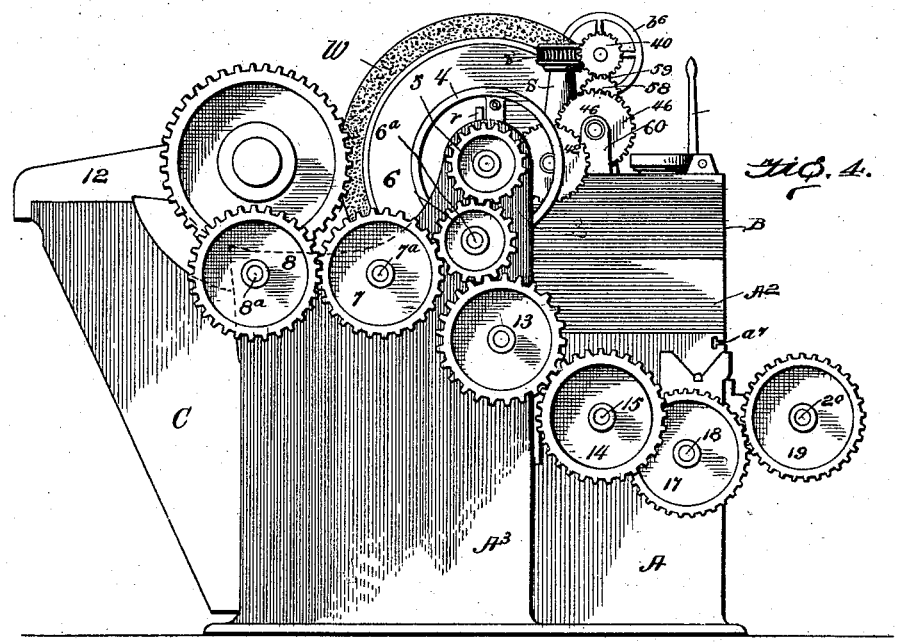
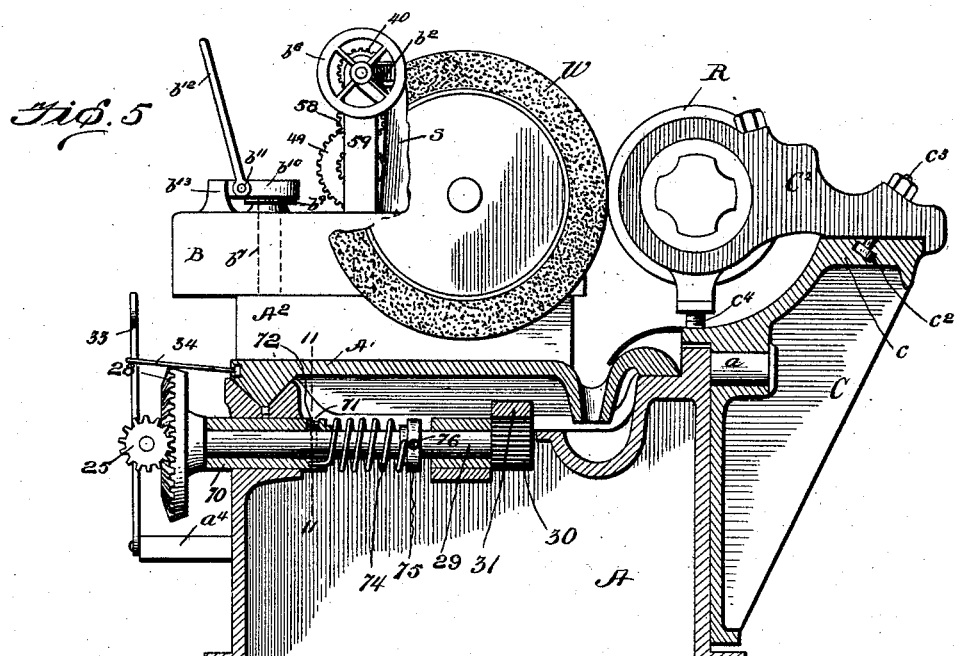
Witnesses
B. M. Offutt,
K. Hurst.
Inventor
Abraham B. Landis,
by E. W. Bradford
Attorney No. 785,258. PATENTED MAR. 21, 1905.
A. B. LANDIS.
GRINDING MACHINE.
APPLICATION FILED FEB. 12, 1904.
5 SHEETS—SHEET 4.
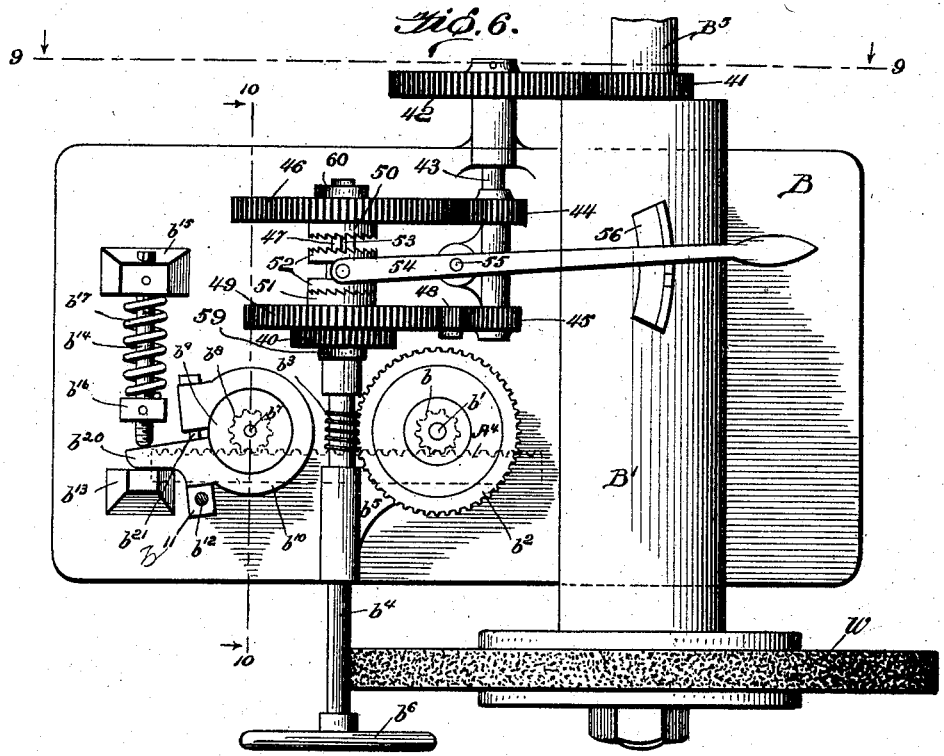
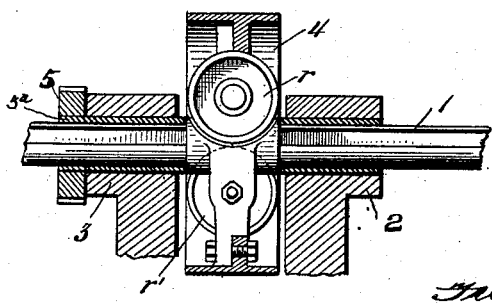
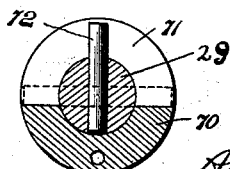
Witnesses
B. M. Offutt.
X. Hurst.
Inventor
Abraham B. Landis,
by C. W. Bradford
Attorney No. 785,258. PATENTED MAR. 21, 1905.
A. B. LANDIS.
GRINDING MACHINE.
APPLICATION FILED FEB. 12, 1904.

5 SHEETS—SHEET 5.

No. 785,258. Patented March 21, 1905.

UNITED STATES PATENT OFFICE.

ABRAHAM B. LANDIS, OF WAYNESBORO, PENNSYLVANIA.

GRINDING-MACHINE.

SPECIFICATION forming part of Letters Patent No. 785,258, dated March 21, 1905.

Application filed February 12, 1904. Serial No. 193,284.

*To all whom it may concern:*

Be it known that I, ABRAHAM B. LANDIS, a citizen of the United States, residing at Waynesboro, in the county of Franklin and State of Pennsylvania, have invented certain new and useful Improvements in Grinding-Machines, of which the following is a specification.

In the construction of grinding-machines for grinding of work of a heavy character—such as the rolls for rolling-mills, &c.—many difficulties are encountered because of the unusual size and weight of the machine and the work to be handled and operated upon thereby.

The object of my said invention is to provide various improvements in the construction and arrangement of grinding-machines whereby they are particularly adapted for work of the character above mentioned. Such improvements relate to means for conveniently handling the work and manipulating the parts of the machine to operate thereon advantageously and at the same time permit a speed which will accomplish the work in a rapid and efficient manner. Such machine is adapted to have the operator stand near the grinding-wheel upon the carriage and be carried back and forth in a position to conveniently watch the work and readily manipulate the operating mechanism. Said improvements further relate to providing a tilted or adjustable table on which the work is supported, whereby said work may be ground slightly concave or of a decreasing diameter from its ends toward its center; further, to the construction and arrangement whereby all parts are driven positively without belting, and the overhead mechanism common to this class of machine is dispensed with, making said machine self-contained and sufficiently powerful and effective in all its parts for the work for which it is particularly designed; further, to an improved "backlash" mechanism by which the grinding-wheel is held away from the work against all jar or accidental movement and all play between the grinding-wheel base and its moving mechanism taken up, and, further, to means for easing the connection between the clutch parts of the reversing mechanism at each end of the movement of the carriage, so as to avoid undue shock and wear upon the machine, all as will be hereinafter more fully described and claimed.

Figure 10:
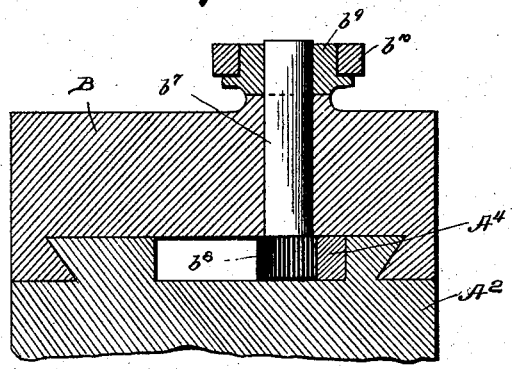

Referring to the accompanying drawings, which are made a part hereof and on which similar reference characters indicate similar parts, Figure 1 is a top or plan view of a grinding-machine embodying my said invention; Fig. 2, a front elevation of the same; Fig. 3, a rear elevation; Fig. 4, an end elevation looking in the direction indicated by the arrows from the dotted line 4 4 in Fig. 2; Fig. 5, a cross-section looking in the direction indicated by the arrows from the dotted line 5 5 in Fig. 2; Fig. 6, a top or plan view of the wheel-base and parts carried thereby; Figs. 7 and 8, detail views illustrating the manner of mounting the main driving-wheel on the main driving-shaft; Fig. 9, an end view of the grinding-wheel base and parts mounted thereon as seen when looking downwardly from the dotted line 9 9 in Fig. 6; Fig. 10, a detail section through the wheel-base on the dotted line 10 10 in Fig. 6, and Fig. 11 a cross-section on the dotted line 11 11 in Fig. 5.

In said drawings the portions marked A represent the main bed of the machine, B the grinding-wheel base, and C the table or support for the work.

The main frame or bed of the machine is preferably a large casting of suitable size and formed to support the parts, being hollow, as shown in Fig. 5, and having a carriage A' mounted on its top and adapted to travel longitudinally thereof, as shown in several of my former patents. Said carriage has a transverse support or "slide" $A^2$ mounted thereon, upon which the wheel-base or "slider" B is adapted to slide. An extension $A^3$ is either cast with or rigidly secured to the end of the machine at the left, as shown in Fig. 1, for the purpose of supporting the bearings for the various shafts and gearing for driving the mechanism.

The wheel-base or slider B is of suitable form, mounted in a well-known manner upon the slide $A^2$ and adapted to travel transversely of the carriage A' toward and from the work. It carries a bearing B' for the spindle $B^5$ of the grinding-wheel $w$ and is connected with the slide by means of a rack-bar and pinion connection. Said rack-bar $A^4$ is rigidly secured on one side of a longitudinal recess in the top of said slide $A^2$, as best shown in Fig. 10, and a pinion $b$ on a vertical shaft $b'$, mounted in a vertical bearing on the top of the base B, engages therewith. On the top of said shaft $b'$ is mounted a worm gear-wheel $b^2$, with which a worm $b^3$ on a horizontal shaft $b^4$ engages. Said horizontal shaft $b^4$ is mounted in bearings in a suitable bracket $b^5$ on one side of the vertical standard S, containing the bearing for shaft $b'$, and has a hand-wheel $b^6$ on its outer end, by which it may be operated. A second vertical shaft $b^7$, having a pinion $b^8$ on its lower end, is mounted a short distance in front but in line with shaft $b'$. On the top of shaft $b^7$ is mounted a friction-wheel $b^9$, which is surrounded by a friction-band $b^{10}$. Said friction-band is of the form shown best in Fig. 6, with a slit in one side and a transverse bolt $b^{21}$ extending through the ends. Said bolt has a nut $b^{11}$ on its outer end, which has a handle or lever $b^{12}$ on one side thereof. One end of said friction-band $b^{10}$ is extended into an arm $b^{20}$ and adapted to rest against a lug $b^{13}$, cast upon the top of base B adjacent thereto. A rod $b^{14}$ is mounted to slide transversely in a perforation in a lug $b^{15}$, also formed on the base B opposite the lug $b^{13}$. A nut $b^{16}$ is mounted on said rod, and a spring $b^{17}$ is interposed between said nut and the lug $b^{15}$, the outer end of said rod being adapted to rest against the adjacent side of the projecting end of arm $b^{20}$ of said friction-band. After feeding the grinding-wheel forward to the work, which is done through shaft $b^4$, geared to the rack-bar $A^4$, and the gearing connected with said shaft, the band $b^{10}$ is tightened upon the wheel $b^9$ by adjusting the nut $b^{11}$ by means of the lever $b^{12}$, so that it will clamp the rim of said wheel and turn therewith. As the wheel-base moves forward the shaft $b^7$ will turn, and the wheel $b^9$ and the band $b^{10}$ will turn therewith, which will operate to force the arm $b^{20}$ of said band toward lug $b^{15}$, forcing the sliding rod $b^{14}$ back and compressing the spring $b^{17}$, the tension of which is adjusted as desired by means of the nut $b^{16}$ on said rod. Said rod is permitted to slide through the aperture in the lug $b^{15}$ by means of the slot therein. By this means the wheel-base is held under the tension of said spring (or an equivalent device) against any vibration, and the forward motion of the grinding-wheel toward the work can be only what is obtained by the positive feed of the mechanism, all backlash being taken up by the mechanism just described. By releasing the band $b^{10}$ from the rim of wheel $b^9$ by backing the nut $b^{11}$ the wheel is left to move freely by the mechanism, and the arm $b^{20}$ is thrown back against lug $b^{13}$ until again clamped to said wheel $b^9$.

I have also provided mechanism for moving the wheel-base to and from the work by power taken from the spindle $B^5$ of the grinding-wheel, whereby ease in the operation of such a large machine is secured. As shown, it consists of a pinion 40, mounted upon the inner end of said shaft $b^4$ and connected by a train of gearing with a pinion 41, mounted upon the end of the grinding-wheel spindle $B^5$. Said train of gearing comprises a cog-gear 42, mounted upon a counter-shaft 43, journaled in suitable bearings formed on the top of the wheel-base. Pinions 44 and 45 are also mounted upon said counter-shaft 43. Pinion 44 engages a gear-wheel 46, mounted upon a counter-shaft 47, journaled in suitable standards 59 and 60, formed on the top of the wheel-base. Pinion 45 is connected by an intermediate gear 48 with a gear-wheel 49, also mounted upon shaft 47 adjacent to wheel 46. Half-clutches 50 and 51 are formed upon the adjacent faces of the hubs of wheels 46 and 49, which wheels are mounted to turn loosely upon said shaft 47. A sliding double-faced clutch 52 is mounted between said hubs, secured to said shaft 47 by means of a spline 53. A forked lever 54 engages with a circumferential groove in said clutch 52 in a well-known manner and is pivoted on a vertical pivot 55 in a suitable bearing on the side of the bracket supporting the bearings for the shaft 43. Said lever engages with a notch in a sector 56, formed on the upper side of the bearing $B'$ for the grinding-wheel spindle, said notch being formed with three rests for said lever, which are adapted to hold it in a position to engage clutch 52 with either of wheels 46 or 49 or hold said clutch midway between them and out of engagement with either. By this means, as will be readily understood, shaft 47 may be driven in either direction desired by motion imparted by said wheel-spindle. Adjacent to wheel 49 on shaft 47 is a pinion 57, which meshes with a second pinion 58, journaled on a stud-shaft in the side of standard 59, and said wheel 58 meshes with pinion 40 on shaft $b^4$. Motion is thus transmitted through said gearing to the shaft $b^4$ from the wheel-spindle $B^5$ to drive said shaft in whichever direction is desired to feed the wheel-base to the work or feed it back away from the work.

The table C is preferably a large casting of a length corresponding to the main portion of the bed A, consisting of a wide web with a top $c$ of sufficient width to support the head and foot stock, the same being mounted on the front side of the bed A by means of a pivot $a$, centrally located and held by means of bolts $a'$, extending through slots $c'$ in the ends of said web. By this means said table may be tilted longitudinally to a limited degree for a purpose to be presently described. In the top of the table is formed a longitudinal T-shaped groove $c^2$, and the head-stock $C'$ and the foot-stock $C^2$ are secured to the table by means of bolts $c^3$, the heads of which engage with said groove, the bolts extending through perforations in said head-stock and foot-stock, as shown most clearly in Fig. 5. The inner ends of said head-stock may be supported by means of a screw-threaded foot $c^4$, inserted in a perforation in a suitable lug directly beneath the work.

The main driving-shaft 1 is mounted in bearings in brackets 2 and 3, which are mounted on the extension $A^3$ of the bed of the machine, and a bearing in a bracket $A^{10}$ on the end of the carriage $A'$. Said driving-shaft is connected at its inner end by means of universal joints of ordinary construction with the spindle $B^5$ of the grinding-wheel $w$. The object of these universal joints is to permit the grinding-wheel base or slider to be moved to and from the work while rotating the wheel-spindle by shaft 1. The main driving-pulley 4 is mounted on said shaft between said brackets 2 and 3, with long sleeves or hubs $5^a$ extending through bearings in said brackets, and is adapted to have said shaft 1 slide therethrough. To provide for this, I have formed said shaft, as indicated most plainly in Figs. 7 and 8, with longitudinal right-angle recesses in diagonally opposite sides and antifriction-rollers $r$ and $r'$, journaled on the opposite sides of the spokes of said pulleys to engage with and travel in said recesses. By this means the pulley and shaft are secured to rotate together; but the shaft is permitted to travel through said pulley longitudinally with very slight friction when the carriage $A'$ travels back and forth with the grinding-wheel in operation. A pinion 5 is mounted outside of bracket 3 on the outer end of the sleeve-bearing $5^a$, which is part of pulley 4, through which said shaft 1 slides and meshes with a pinion 6 on a stud-shaft $6^a$ on the end of the bed, which in turn meshes with the spur-wheel 7 on the end of stud-shaft $7^a$, which meshes with gear-wheel 8 on shaft $8^a$, which is journaled in an extension of the bracket 3 at one edge of the part $A^3$. Said shaft $8^a$ is connected by a universal joint with a two-part shaft 9 and 10, said two parts being mounted to telescope one within the other and connected by another universal joint with the stud-shaft 61, journaled in the end of tilting table C. A pinion 62 on shaft 61 meshes with gear-wheel 63 on the spindle of the work-driving part 64. Said spindle is journaled in a bracket 12, mounted on the table C, by means of bolts $c^6$, similarly as are the head-stock and foot-stock above described. The universal joints permit the tilting of the table while the machine is in operation or permit the operation with the table at any angle. Another gear-wheel, 13, meshes with the opposite side of the gear-wheel 6 and in turn meshes with the gear-wheel 14 on the end of a shaft 15, which is journaled in suitable bearings in an extension of bracket 3 and also in the end of the main part of bed A.

Said shaft has a gear-wheel 16 on its inner end which meshes with another gear-wheel, 17, on a stud-shaft 18, projecting out from the end of the bed A. Said gear-wheel 17 meshes with the gear-wheel 19 on the outer end of shaft 20, which is journaled in bearings in brackets 21, 22, and 23 on the side of said bed A. Bevel gear-wheels 24 and 25, having parts of clutches 26 and 27 on the adjacent faces of their hubs, are mounted on said shaft 20 between the brackets 22 and 23. Said bevel gear-wheels 24 and 25 mesh with opposite sides of the bevel gear-wheel 28, which is mounted on the outer end of the transverse shaft 29, which is journaled in suitable bearings in the bed A and has a pinion 30 on its inner end which meshes with the longitudinal rack-bar 31 on the carriage $A'$ and serves to drive said carriage. Said gear-wheels 24 and 25 are mounted to run loosely on said shaft 20 and are adapted to be locked to said shaft by a sliding clutch 32, secured on said shaft 20 between said gear-wheels by means of a spline or any well-known manner. Said clutch is operated by means of a lever 33, pivoted at its lower end to the bracket $a^4$ on the bed A beneath the wheel 28. Trips 34 and 35 are adjustably mounted in a longitudinal groove $a^7$ in the edge of the carriage $A'$ and project outwardly a sufficient distance to strike said lever 33 when the carriage travels to the point where they will reach it. By this means the travel of the carriage is reversed at each end of its movement at the point desired, it being regulated by a proper adjustment of said trips 34 and 35. In order to avoid undue shock, strain, and wear upon the machine by reversing its motion through the mechanism just described, I have provided a yielding connection between gear-wheel 28 and shaft 29 and means for starting the gears 24 and 25 into motion in the same direction with the clutch 32 before said parts actually engage. The hub 70 of said wheel 28 projects through a bearing in the bed A and is provided with a transverse slot 71, extending through one side to beyond the center, as shown most clearly in Fig. 11. A pin 72 is mounted in a transverse perforation in shaft 29, with one end projecting beyond its surface and into said slot. Said wheel 28 and shaft 29 are thus permitted a limited independent movement of one-half revolution. A coiled spring 74 is mounted around said shaft, with one end inserted in a longitudinal perforation in the end of hub 70 and its other end inserted in a similar perforation in a collar 75, rigidly secured on said shaft by a set-screw 76. The parts are adjusted so that the pin 72 will be held normally by spring 74 in the position shown in whole lines in Fig. 11. The operation of wheel 28 through the driving mechanism in either direction will therefore turn its hub a distance equal to one-quarter revolution independent of shaft 29 and will operate to tighten said spring and store a tension therein, which will serve to reverse the motion of wheel 28 and the clutch parts 26 and 27 immediately upon being released from connection with the power-driven clutch part 32. As soon as the hub and shaft turn one-quarter of a revolution independently they are locked together by the pin 72 striking one end or the other of slot 71 in said hub, as indicated by dotted lines in Fig. 11. Thus when the lever 33 is thrown by the trips 34 and 35 in either direction as soon as the clutch parts are separated the tension of spring 74 starts wheel 28 and the wheels 24 and 25 and the clutch parts 26 and 27, forming a part thereof, in the reverse direction, so that when the opposite face of clutch part 32 meets the other clutch part it is moving in the same direction with it, and the wheel 28 being also allowed a slight independent movement against spring 74 before becoming locked to shaft 29 the reversal of the carriage is accomplished without undue shock, which would otherwise result from suddenly overcoming the inertia of parts of such great weight.

The object of the tilting table is for the purpose of causing the machine to grind a concave surface in the length of the rolls, which is a required feature of various rolls to be ground and which this arrangement effectively accomplishes, since to swing the work in a plane at right angles to a line passing through the centers of the grinding-wheel and the work the center of the roll is caused to be farther from the wheel at the ends than at the center.

In operation the work, such as the roll R, being mounted in the head and foot stock, as shown in the principal views, and connected with the work-driving shaft 63, power is applied to the main driving-shaft 1 through pulley 4, which through the train of gearing above described starts the grinding-wheel $w$ and the work in motion. The wheel-base having been adjusted to bring the grinding-wheel $w$ into proper relation with the work, the carriage A' travels back and forth by the mechanism described a distance equal to the length of the work to be ground, the change in its motion being automatically secured by means of the trips 34 and 35 striking and reversing the lever 33 at the proper points, as before described. The wheel-base is fed toward the work as the grinding proceeds by means of the hand-wheel $b^6$ or by means of the train of gearing connecting pinion 40 on the shaft $b^4$ with pinion 41 on the grinding-wheel spindle $B^5$. The friction-band $b^{10}$, being clamped to the rim of wheel $b^9$, throws the arm $b^{20}$ against the spring $b^{17}$, and said spring thus holds the grinding-wheel against any undue vibration or forward vibratory motion, all backlash being thus taken up by said spring.

It is obvious that many modifications in details of construction may be made without departing from my invention. For example, while I prefer the construction by which the grinding-wheel shall traverse the work it is obvious that the work might be mounted upon a traveling carriage and the grinding-wheel remain in a fixed position longitudinally of the machine. In such case the universal couplings and grooved shaft employed to drive the grinding-wheel would be employed to drive the work instead. In the backlash mechanism it is apparent that a weight might be substituted for the spring and that modifications of obvious character may be made in the mechanism for avoiding undue shock in reversing the travel of the carriage.

Having thus fully described my said invention, what I claim as new, and desire to secure by Letters Patent, is—

1. In a grinding-machine, the combination, of the frame, the carriage, the slide on said carriage, the grinding-wheel base mounted on said slide to move toward and from the work, the grinding-wheel thereon, mechanism for feeding said wheel-base, a spring for taking up the backlash and means for connecting and disconnecting said spring to said mechanism at will, substantially as set forth.

2. In a grinding-machine the combination with the feeding mechanism for the grinding-wheel of a spring for holding said wheel away from the work and means for throwing said spring into or out of operation at will, substantially as set forth.

3. In a grinding-machine the combination with the feeding mechanism for the grinding-wheel, means for holding said wheel away from the work and mechanism for throwing said means into and out of operation at will, substantially as set forth.

4. In a grinding-machine, the combination with the feeding mechanism for the grinding-wheel of a spring for normally holding said wheel away from the work, means for throwing said spring into or out of operation at will, and means for adjusting the tension of said spring, substantially as set forth.

5. In a grinding-machine, the combination with the mechanism for feeding the grinding-wheel to the work of a spring mounted to be connected to said mechanism to normally hold the wheel away from the work or be disconnected to leave said mechanism free from said spring, and means for throwing said spring into or out of operation, substantially as set forth.

6. In a grinding-machine, the combination, of the grinding-wheel base, the slide upon which said base is mounted, gearing for feeding said base to carry the wheel to and from the work, part carried by said base and part by said slide, a spring adapted to be connected to said mechanism to interpose between said base and slide to normally hold said base away from the work, substantially as set forth.

7. In a grinding-machine, the combination, of the wheel-base, the slide on which it is mounted, the mechanism for feeding said base to carry the wheel to and from the work, a spring for holding said mechanism under a tension and take up all slack, and means for connecting and disconnecting said spring at any point along the line of movement of said base, substantially as set forth.

8. In a grinding-machine, a backlash attachment for the grinding-wheel to prevent said wheel from approaching the work further than predetermined by the feeding mechanism, means for making such attachment inactive at will at any point along the line of movement and means for varying its force, substantially as set forth.

9. In a grinding-machine, the combination, of the carriage, the slide, the wheel-base, the grinding-wheel thereon, the work-holding devices, the driving mechanism, and feeding mechanism for the grinding-wheel comprising a shaft journaled in said base, means for operating said shaft, a pinion thereon engaging a rack-bar secured to said slide, said rack-bar, a second shaft journaled in said base and having a pinion engaging said rack-bar, a wheel on the outer end of said shaft, a friction-band adapted to be clamped to or released from the rim of said wheel, a sliding rod mounted to bear against a projection on one side of said band, a spring for holding said rod to said projection and means for adjusting the tension of said spring, substantially as set forth.

10. In a grinding-machine, the combination with the wheel-base of mechanism for feeding said base to carry the wheel to and from the work said mechanism comprising a shaft journaled in said base having a pinion thereon, a rack-bar secured to slide on which said base is mounted with which said pinion engages, means for operating said shaft, a second shaft with pinion engaging said rack-bar, a wheel on said shaft, a band mounted to be clamped to or released from said wheel, and a yield tension device bearing against said band, substantially as set forth.

11. In a grinding-machine the combination of the grinding-wheel base mounted to slide to and from the work, mechanism for moving said base, and gearing connecting said mechanism with the grinding-wheel spindle, whereby said base is moved by power taken from said spindle, substantially as set forth.

12. In a grinding-machine, the combination, of the wheel-base, means for feeding said wheel-base, gearing for operating said feeding mechanism connected with the grinding-wheel spindle, and means for throwing the same into and out of gear at will, substantially as set forth.

13. In a grinding-machine, the combination, of the grinding-wheel base mounted to move on a slide mounted upon the carriage, feeding mechanism for feeding said base to and from the work, gearing connecting said mechanism with the spindle of the grinding-wheel, and a clutch for throwing the same into gear to drive said mechanism in either direction, or hold it out of gear, substantially as set forth.

14. In a grinding-machine, the combination, of the base mounted upon a slide on the carriage, bearings for the wheel-spindle on said base, said wheel-spindle with the grinding-wheel thereon journaled in said bearings, a feed-shaft for feeding said base in either direction, gearing connecting said shaft with said wheel-spindle, a clutch for throwing the same into gear to drive said shaft in either direction and means for holding said clutch out of engagement to disconnect said gear, substantially as set forth.

15. In a grinding-machine, the combination, of the grinding-wheel base mounted to move on a slide, feeding mechanism for feeding said base to and from the work, gearing connecting said mechanism with the spindle of the grinding-wheel, and a clutch for throwing the same into gear to drive said mechanism in either direction, or hold it out of gear, substantially as set forth.

16. In a grinding-machine, the combination, of the base mounted upon a slide, bearings for the wheel-spindle on said base, said wheel-spindle with the grinding-wheel thereon journaled in said bearings, a feed-shaft for feeding said base in either direction, gearing connecting said shaft with said wheel-spindle, a clutch for throwing the same into gear to drive said shaft in either direction and means for holding said clutch out of engagement to disconnect said gear, substantially as set forth.

17. In a grinding-machine, the combination with the bed, of a table for supporting the work mounted on said bed by a horizontal pivot, means for securing said table in the desired adjustment, work-holding devices mounted on said table, a bracket containing a bearing also mounted on said table, a spindle mounted in said bearing having a work-engaging part on its inner end and a gear-wheel on its outer end, the main driving-shaft journaled in bearings on the bed of the machine and a train of gearing embodying a universal coupling and a telescopic shaft connecting said main driving-shaft and the gear of said spindle, substantially as set forth.

18. In a grinding-machine, the combination with the bed of the machine, of a tilting table for supporting the work mounted on said bed, work-holding devices mounted on said table, a work-engaging device on the end of a spindle or short shaft journaled in a bearing mounted on said table, the main driving-shaft mounted on the bed of the machine, a train of gearing connecting said main driving-shaft with a telescopic shaft and a universal coupling between said telescopic shaft and a gear on said work-driving spindle, substantially as set forth.

19. In a grinding-machine, the combination, of the bed, the carriage, the slide, the wheel-base mounted on said slide, means for feeding said slide, the grinding-wheel, the work-holding devices, the main driving-shaft, a train of gearing connecting said main driving-shaft with the work-driving shaft, another train of gearing connecting said main shaft with the carriage-operating mechanism, a connection between said main shaft and the wheel-spindle, and a train of gearing connecting said spindle with the wheel-base feeding mechanism, substantially as set forth.

20. In a grinding-machine, the combination, of the bed, the carriage mounted to reciprocate in ways thereon, the grinding-wheel mounted on a base mounted to slide transversely on said carriage, the main driving-shaft mounted in bearings on said bed to one side of said wheel and a universal connection between said shaft and the spindle of said wheel, substantially as set forth.

21. In a grinding-machine, the combination of the grinding-wheel mounted to slide transversely on a reciprocating carriage and the driving-shaft connected to the spindle of said wheel by a universal connection, substantially as set forth.

22. In a grinding-machine, the combination, of the bed, a carriage mounted to reciprocate in ways thereon, a spindle mounted on said carriage, said spindle connected by devices to a longitudinally-grooved shaft and said shaft arranged to slide through a driving-wheel mounted on one end of the bed or extension thereof, substantially as set forth.

23. In a grinding-machine, the combination, of the bed, a carriage mounted to reciprocate in ways thereon, a spindle mounted on said carriage, said spindle connected at one end by universal connections to a shaft made to slide with said carriage through a driving-wheel at the end of said bed and said driving-wheel connected to turn with said shaft, substantially as set forth.

24. In a grinding-machine, a bed, a carriage mounted to reciprocate thereon, a spindle mounted on said carriage and connected to a shaft made to slide with said carriage through and turn with a driving-wheel at the end of said bed, in combination with work-holding devices mounted upon a pivoted table, substantially as set forth.

25. In a grinding-machine, the combination of the bed, the reciprocating carriage carrying the grinding-wheel, the driving-shaft mounted in bearings to one side of said wheel and connected to the wheel-spindle by a universal coupling, and the driving-pulley mounted on said shaft to permit said shaft to slide therethrough, substantially as set forth.

26. In a grinding-machine, the combination of the bed, the reciprocating carriage mounted thereon, the grinding-wheel mounted on said carriage, the driving-shaft, said driving-shaft being connected to the spindle of said wheel to reciprocate therewith, a pulley mounted on said shaft to permit said shaft to slide therethrough, and means for holding said pulley in a fixed position, substantially as set forth.

27. In a grinding-machine the combination, of the bed, the reciprocating carriage, the grinding-wheel mounted thereon to slide transversely thereof, the driving-shaft coupled to the spindle of the grinding-wheel by a universal coupling, the work-holding table mounted on the bed to tilt vertically, the work-driving shaft, a universal coupling between said shaft and a train of gearing connecting it with the main driving-shaft, and said gearing, substantially as set forth.

28. In a grinding-machine, the combination of the bed, the reciprocating carriage, the grinding-wheel thereon, the driving-shaft coupled to the spindle of said grinding-wheel by a universal coupling, the driving-wheel on said shaft connected thereto by means of grooves in said shaft and wheels on said driving-wheel which engages therewith, substantially as set forth.

29. In a grinding-machine, the combination, of the bed, the reciprocating carriage, the grinding-wheel thereon, the driving-shaft coupled to the spindle of said grinding-wheel and arranged to slide therewith, the driving-wheel mounted thereon and connected therewith by grooves formed in said shaft and wheels journaled on said wheel and adapted to travel in said grooves, substantially as set forth.

30. In a grinding-machine, the combination of a grinding-wheel mounted to reciprocate and coupled to a driving-wheel by means of a shaft coupled to its spindle and mounted to slide through said driving-wheel, substantially as set forth.

31. In a grinding-machine, the combination, of the grinding-wheel mounted on a reciprocating carriage and geared to a driving-wheel by a shaft coupled to its spindle by a universal coupling and mounted to slide through said driving-wheel, substantially as set forth.

32. In a grinding-machine, the combination, of the bed, the reciprocating carriage, the grinding-wheel on said carriage, the driving-shaft mounted to slide in bearings and coupled to the spindle of said grinding-wheel, the main driving-wheel on said shaft mounted between fixed bearings, said shaft being provided with longitudinal grooves and said wheel being provided with small wheels on its sides which engage and are adapted to run in said grooves, and another gear-wheel on the outer end of said shaft connecting with the several operating mechanisms, substantially as set forth.

33. In a grinding-machine, the combination, of the bed, the reciprocating carriage thereon, the transversely-sliding grinding-wheel base on said carriage, the driving-shaft coupled to the spindle of said wheel and mounted to slide therewith through suitable bearings, the driving-wheel mounted on said shaft and connected therewith by a groove-and-wheel connection, a second wheel on said shaft through which it may slide connected to the work-driving shaft and the carriage-driving shaft by appropriate trains of gearing, substantially as set forth.

34. In a reversing-gearing for grinding-machines, the combination of the feed-shaft, a gear-wheel mounted on said feed-shaft to have a limited independent movement, an elastic connection between said gear-wheel and shaft, means for locking said wheel and shaft rigidly together after the limited movement, other gear-wheels meshing with opposite sides of said first-named gear-wheel and having clutch parts on the adjacent faces of their hubs, a double-faced clutch part interposed between them and mounted to turn with a power-driven shaft, and means for throwing said clutch part at the end of each movement of the carriage, substantially as set forth.

35. In a grinding-machine, a cushioning mechanism for the reversing-clutches comprising an elastic connection adapted to permit a limited independent movement of the driving-wheel and feed-shaft, substantially as set forth.

36. In a grinding-machine, a cushioning mechanism for the reversing-clutches comprising a spring interposed between a part of the gear-wheel on the driving-shaft and said driving-shaft, whereby said parts are permitted a limited independent movement and the spring thereby compressed to store a tension which will start the wheel in a reverse direction immediately upon being released from the power-driven shaft, substantially as set forth.

37. A cushioning mechanism for the clutches of the reversing-gear comprising a shaft geared to the reciprocating carriage, a gear-wheel mounted thereon to have a limited independent rotary movement, a spring connected at one end to said gear and at its other end to said shaft, whereby as said gear is turned on said shaft said spring will be compressed to store a tension which will operate to reverse the motion of the gear-wheel immediately upon its being released from the power-driven shaft, substantially as set forth.

38. In a grinding-machine, a cushioning mechanism for the reversing-clutches comprising the shaft for driving the carriage, a gear mounted thereon having a transverse slot in its hub, a pin secured in said shaft and extending into said slot, a spring secured at one end in said hub and at its other end in a collar locked to said shaft in a position to normally hold said pin midway in said slot, whereby as said wheel is rotated in either direction, said spring is compressed until said pin reaches one end of said slot and a tension thus secured which will operate to start the wheel in the reverse direction immediately upon its connection with the driving-power being broken, substantially as set forth.

39. In a grinding-machine, a reversing mechanism for the carriage comprising two gears having clutch parts running in opposite directions, a double-faced clutch part interposed between them to engage therewith alternately, a gear-wheel engaging said first-named gears, mounted on the shaft for driving said carriage, said shaft, said gear-wheel being connected thereto by an elastic connection which permits a limited independent movement and by a positive connection at the end of said limited movement, substantially as set forth.

40. In a grinding-machine, a reversing mechanism for the carriage comprising the shaft geared thereto, a gear-wheel mounted thereon and secured thereto by means of an elastic connection which permits a limited independent movement in both directions, and a positive connection which locks the two parts together at the end of the limited movement, whereby upon the release of the clutch, said gear-wheel and the clutch parts geared thereto will be started in the reverse direction by the tension of said elastic connection, and the inertia of the carriage overcome gradually without undue strain, substantially as set forth.

41. In a grinding-machine, a carriage-reversing mechanism comprising a driving-shaft driven through reversing-clutches and means for storing power under elastic condition in both directions of motion, whereby when one clutch is released to engage the clutch for the opposite motion said stored power rotates said last-named clutch through said gear in the direction of said opposite motion, thereby eliminating the shock otherwise occasioned, substantially as set forth.

In witness whereof I have hereunto set my hand and seal, at Waynesboro, Pennsylvania, this 28th day of January, A. D. 1904.

ABRAHAM B. LANDIS. [L. S.]

Witnesses:
   J. E. Frantz,
   Alf. N. Russell.